9818X
Andrews & Austin,
Cook Stove.
Patented July 1, 1836.
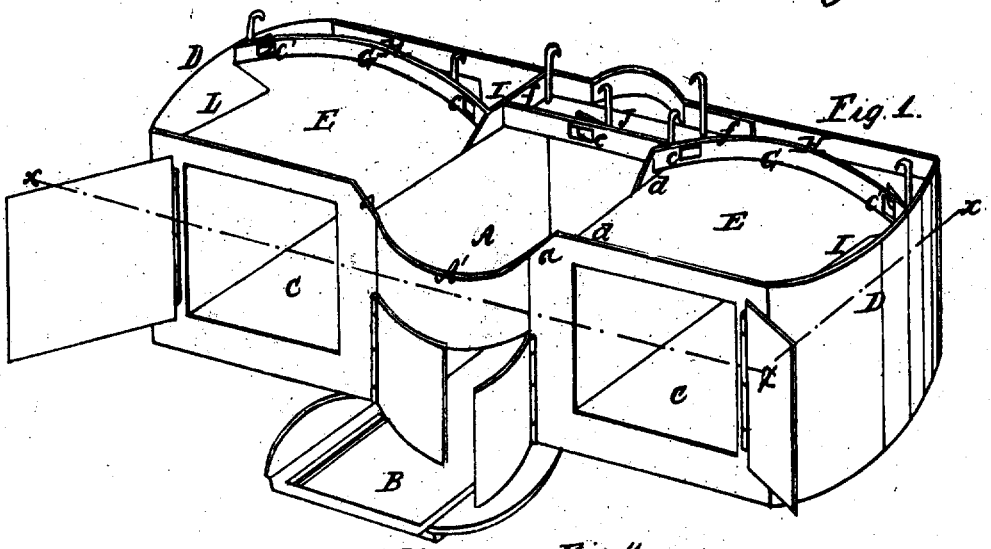
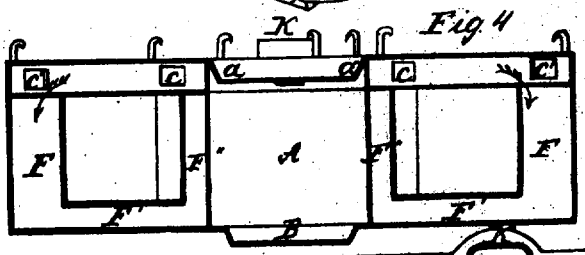
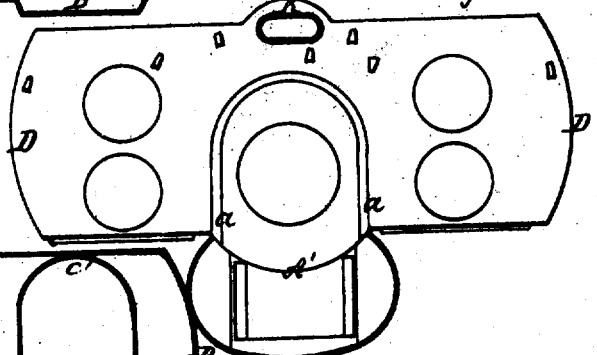
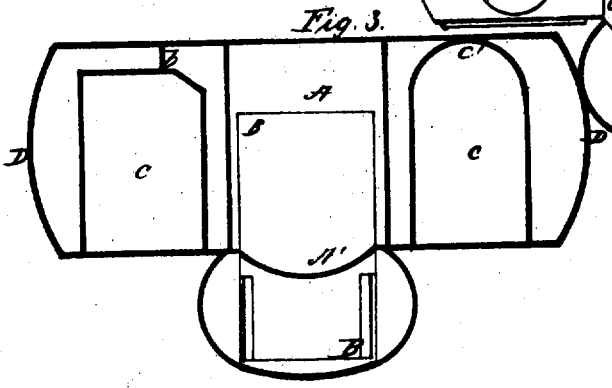

9818X [illegible] 14

July 1, 1836

Ebenezer Andrews & Stephen Austin. Bradford. N. H.

Letters Patent dated July 1. 1836. —

The Schedule referred to in these Letters Patent and making part of the same containing a description of the words of the said Ebenezer Andrews and Stephen Austin themselves of their improvement in the form and construction of cooking Stoves.

To all persons to whom these presents shall come,

Be it known that we Ebenezer Andrews and Stephen Austin of Bradford in the County of Merrimack and State of New Hampshire have invented a new and useful improvement in the form and Construction of Cooking Stoves, by a Stove called Andrews & Austin's cooking Stove and the following is a full and exact description of the construction and operation of said Stove as invented or improved by us viz.

[illegible]

1st. A fire box is constructed of any suitable dimensions say 20 in. in length 16 inches wide and 12 in. high with oval or [illegible] front or plane and hearth of suitable width 2d. On the same hearth with the fire box attached on each side are two departments for ovens one on each side of the fire box 20 inches in length 17 in. wide and 18 in. high rising three inches higher than the fire box. In each of these departments is placed an oven circular or square of cast iron or sheet with a flue laterally from the fire box for a free passage of the fire and heat over the top of the oven, down on the side farthest from the fire box under the oven between it and the hearth to the fire box and extending up between the oven and the fire box nearly to the bottom of the flues at first starting.

The ovens may be attached to the ends of the middle partitions at the back part and the flues may be continued nearly around the back parts of the ovens also; but it is best to have the back part of the oven circular and the used for a narrow space [illegible] the back side of the Stove nearly from the top to bottom of the oven. This will throw the heat more [illegible] around the oven, or if the back of the oven be square a perpendicular partition may be inserted in this flue a part of it.

9818X

A Circular partition is made to pass from the fire box about six inches from the back part of it behind the lateral flues from the fire box between the top of the oven and top of the stove round to about the middle of the side of the stove opposite to the fire box — forming a flue between the circular partition and the outside of the stove about 5 or 6 inches square the top of the oven extending to the outside of the stove in this part to form the floor of this flue except for 5 or 6 inches square next to the fire box, where it is left open for the smoke and heat to pass off to the main flue which is continued about six inches square across the back and upper part of the fire box over the middle of which flue is the funnel for the smoke to pass off.

At the heads of these flues made by the circular partitions dampers are placed which being shut the smoke and heat pass down under and around the oven up into the flue at the back part of the fire box and so off by the funnel.

Dampers may also be placed at the mouths of the flues from the fire box so as to turn the heat all on one side by opening one and shutting the other. Dampers may also be placed next to the fire box so as to make when shut a part of the aforesaid circular partition which being open will form a more direct passage for the smoke when the heat is not wanted over the oven. An aperture with a damper may also be constructed from the back part of the fire box to communicate immediately with the main flue across the back and upper part of the fire box.

This stove is calculated for five boilers one large directly over the fire box and two of smaller size over each oven. These flues and partitions are thus placed and arranged to equalize the heat around all parts of the oven and at the same time to take the greatest advantage of the heat for other purposes.

What we claim as our invention and improvements is the aforesaid circular partitions and the arrangement of the ovens and the aforesaid flues for the purposes aforesaid. In testimony that the preceding is a true specification of our said improvement as above described, we have hereunto set our hands this sixth day of April A D 183[illegible]. Eleazer Andrus

Stephen Austin

Luther [illegible]

Moses A Hadley

Enrd. [illegible]

[568 w[illegible]]

9518X

Mar 18, 1836 receive them - Dated February 17th 1836 -

Witnesses
H. N. Wilbur
Jacob Fuller Jr

Elam Wilbur 40 words

Drawing